United States Patent [19]
Muramatsu et al.

[11] Patent Number: 6,010,344
[45] Date of Patent: Jan. 4, 2000

[54] EJECTION PROTECTION MECHANISM FOR CARD MEDIA

[75] Inventors: Hidenori Muramatsu, Kanagawa; Hiroto Handa, Tochigi; Hiroyuki Umezawa; Makoto Hamada, both of Saitama, all of Japan

[73] Assignee: The Whitaker Corporation, Wilmington, Del.

[21] Appl. No.: 08/894,425

[22] PCT Filed: Mar. 29, 1996

[86] PCT No.: PCT/US96/04333

§ 371 Date: Aug. 19, 1997

§ 102(e) Date: Aug. 19, 1997

[87] PCT Pub. No.: WO96/30866

PCT Pub. Date: Oct. 3, 1996

[30] Foreign Application Priority Data

Mar. 31, 1995 [JP] Japan ................................ 7-100569

[51] Int. Cl.[7] .................................................. H01R 13/62
[52] U.S. Cl. ............................................................. 439/159
[58] Field of Search ................................. 439/152, 153, 439/159; 361/754, 798

[56] References Cited

U.S. PATENT DOCUMENTS

| | | | |
|---|---|---|---|
| 5,275,573 | 1/1994 | McCleerey | 439/159 |
| 5,286,214 | 2/1994 | Takahashi | 439/159 |
| 5,305,180 | 4/1994 | Mitchell et al. | 439/159 |
| 5,466,166 | 11/1995 | Law et al. | 439/159 |
| 5,818,182 | 10/1998 | Viswanadham et al. | 439/159 |
| 5,836,775 | 11/1998 | Hiyama et al. | 439/159 |
| 5,879,175 | 3/1999 | Muramatsu et al. | 439/159 |

FOREIGN PATENT DOCUMENTS

| | | |
|---|---|---|
| 0167356 A2 | 6/1985 | European Pat. Off. . |
| 0167356 A3 | 6/1985 | European Pat. Off. . |
| 0429976 A2 | 11/1990 | European Pat. Off. . |
| 0608814 A1 | 1/1994 | European Pat. Off. . |
| 0644642 A2 | 7/1994 | European Pat. Off. . |
| 80 04487 | 9/1981 | France . |

*Primary Examiner*—Paula Bradley
*Assistant Examiner*—Tho D. Ta

[57] ABSTRACT

A motor driven ejection system responsive to control signals so as to allow the insertion and/or ejection of a card under computer automatic control. The ejection system has a motor responsive to control signals to cause forward/reverse movements of the motor or render the motor stationary, so that the insertion and the ejection of a card is completely dominated by a computer and not susceptible to any operator interaction that might otherwise damage or distort information on the card.

8 Claims, 11 Drawing Sheets

Fig 11

EJECTION PROTECTION MECHANISM FOR CARD MEDIA

The present invention relates to a compartment for a card, particularly an IC card (referred to as simply card below) in a read/write device for a personal computer and the like, more specifically to a mechanism for ejecting or unloading such card from the compartment.

Conventionally, insertion (loading) and ejection (unloading) of a card in a personal computer and the like are made manually in general, thereby allowing an operator to insert or eject the card at any desired time. This means that no mechanism is employed to prevent accidental ejection of the card.

Unfortunately, such conventional manual card insertion/ejection mechanism is unprotected from a thief. More importantly, the ejection mechanism can be operated while reading and writing a signal in the card memory, thereby possibly damaging the stored memory. It is preferable to provide a device where it is not too easy to acuate the manual ejection by mistake. It is, therefore, a feature of the present invention to provide an electrically powered ejection of the card and also an electrically operated protect operation to disable card ejection by mistake.

In order to achieve the above features the present invention is directed to a read/write device of a card including a card compartment and an ejection mechanism to enable ejection of the card by electrically pushing the card manually inserted into the card compartment. The present invention is characterized in the provision of a protect member adjacent to the mouth or entrance of the compartment to open or close as part of the ejection mechanism so that the card can be inserted or ejected freely in the open position while preventing the card from being ejected in the closed position.

The pushing portion of the electrically powered ejection mechanism is engagable with the manual operation portion in the pushing direction by coupling a rack to an electrically operated pinion positioned adjacent to the center portion of one side edge of the card compartment.

Such ejection mechanism preferably comprises a holder having projections engaging the insertion end of the card, a pushing member ganged with the holder, and a shift plate driven in a linear mode and having a rack to engage the pinion and projections engaging only in the pushing direction of the pushing member. The protect member is adapted to engage a cam groove in the shift plate for controlling the operation thereof.

Alternatively, the ejection mechanism may comprise a holder having projections to engage the insertion end of the card, and a shift plate pivotable by a rack in a fan-shape rack engaging the pinion, pivotally supported on a frame of the compartment and engaging projections formed with the holder only in the pushing direction. The protection member engages a cam groove in the shift plate for controlling the operation thereof.

Additionally, the ejection mechanism may comprise a pushing member having projections engaging the insertion end of the card and pivotally supported on a frame of the compartment, and a shift plate having a fan-shape rack engaging the pinion and engaging driving projections on the pushing member only in the pushing direction. The protection member engages a cam groove in the shift plate for controlling the operation thereof.

Preferably, the protect member is formed at each side of the card. Further included are switch means for detecting completion of insertion of the card, switch means for detecting the closed position of the protection member, switch means for detecting complete ejection of the card and switch means for detecting that the card can be inserted or ejected.

The preferred embodiments of the invention will now be described by way of example with reference to the drawing figures where:

FIG. 3 is a plan view of the first embodiment with the card ejected.

The present invention as constructed above establishes electrical connection of the card by way of connector terminals by manually loading it in the card compartment. Note that the manual operation mechanism and the electrically powered driving mechanism operationally engage only when the latter mechanism operates in the ejecting or pushing direction. This means that the card can be inserted or ejected at any time so long as the electrically powered driving mechanism is not functioning.

On the other hand, the protection number inhibits ejection of the card in its closed position, thereby permitting the open/close operation of the protection member only electrically. Accordingly, once the protection member is closed, manual ejection of the card is disabled. After closing the protection member, all ejecting steps of the card from opening the protection member to ejection of the card are performed automatically and sequentially based on the detection of each step by various switch means.

Figure 11:
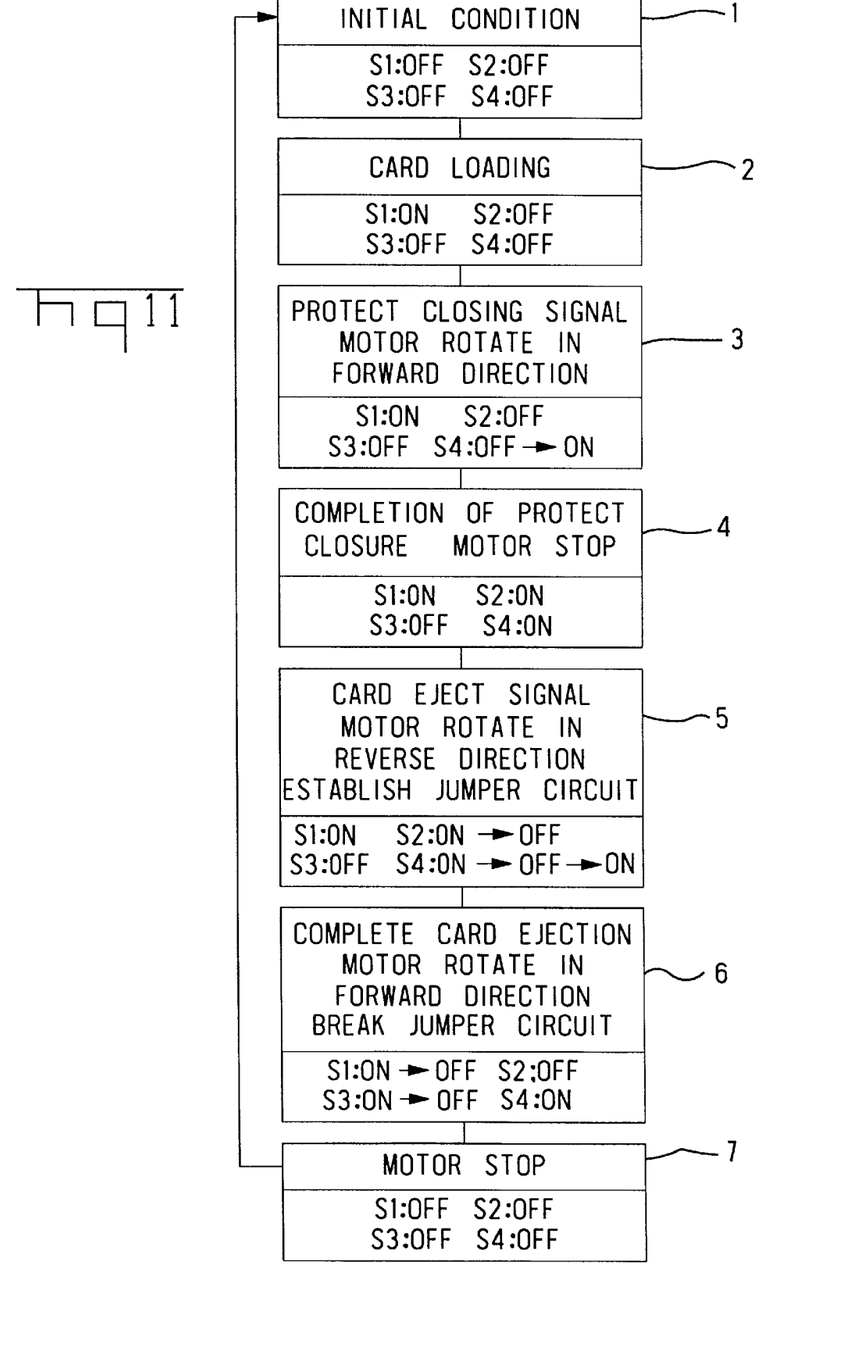
FIG. 11 is a flowchart of the switches for detecting various operation stages of the ejection protection mechanism of a card according to the present invention.

FIG. 11 is a flowchart showing operations of the various switch means. STEP 1 represents an initial condition when no card is loaded or inserted into the card compartment. In this condition, non-operative are a switch ($S_1$) for detecting the complete insertion of the card, a switch ($S_2$) for detecting the closure of the protection member, a switch ($S_3$) for detecting the complete ejection of the card and a switch ($S_4$) for detecting if the card can be inserted or ejected.

STEP 2 is loading of the card in which the switch $S_1$ becomes operative or energized while all or the other switches $S_2$–$S_4$ remain non-operative. In STEP 3, a control panel sends a signal to close the protection member, thereby driving a motor in its forward direction to make the switch $S_4$ operative thereby operating the motor circuit. $S_1$ remains in its operative condition while $S_2$ and $S_3$ are non-operative. When completing closure of the protection member in STEP 4, $S_2$ becomes operative and the motor stops rotating. At this time, $S_2$ and $S_4$ remain operative while $S_3$ remains non-operative.

In STEP 5, a signal to eject the card is sent from the control panel. The motor rotates in the reverse direction and a jumper circuit is set to negate the operation of $S_4$. After reverse rotation of the motor, $S_2$ becomes non-operative with a certain time lag of the mechanical transition time while $S_1$ and $S_3$ remain operative and non-operative, respectively. $S_4$ becomes non-operative for a moment but such non-operative state is electrically negated because of the setting of the jumper circuit.

When $S_3$ becomes operative after complete ejection of the card in STEP 6, the motor is switched from the reverse to the forward direction, thereby releasing the jumper circuit for $S_4$. After a certain time lag equal to the mechanical transition time, both $S_1$ and $S_3$ become non-operative while $S_2$ is non-operative and $S_4$ is operative to maintain operation of the motor circuit. When $S_4$ becomes non-operative in STEP 7, the motor stops and returns to the initial condition in STEP 1. Represented by ON and OFF in these figures are mechanical operative and non-operative conditions rather than electrically on and off conditions, respectively.

Figure 1:
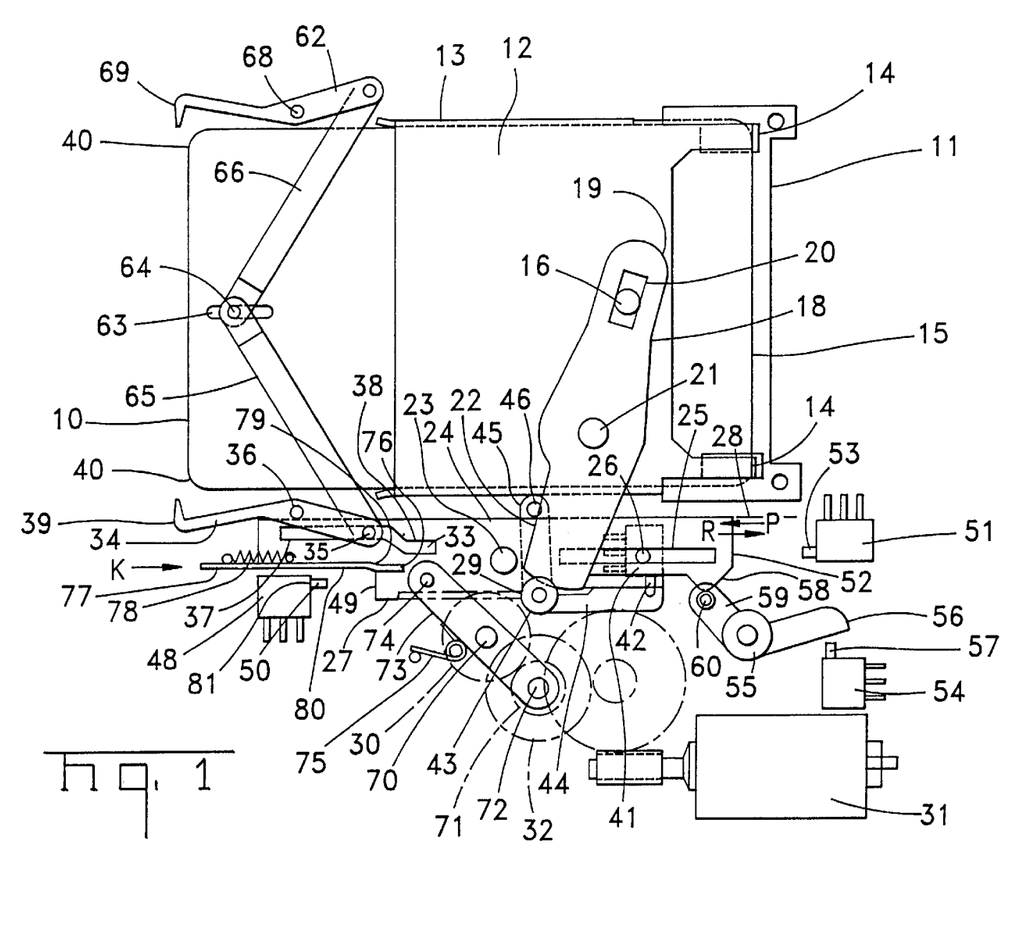
FIG. 1 is a plan view of a first embodiment of the ejection protection mechanism of a card according to the present invention in the card loading condition.
Figure 2:
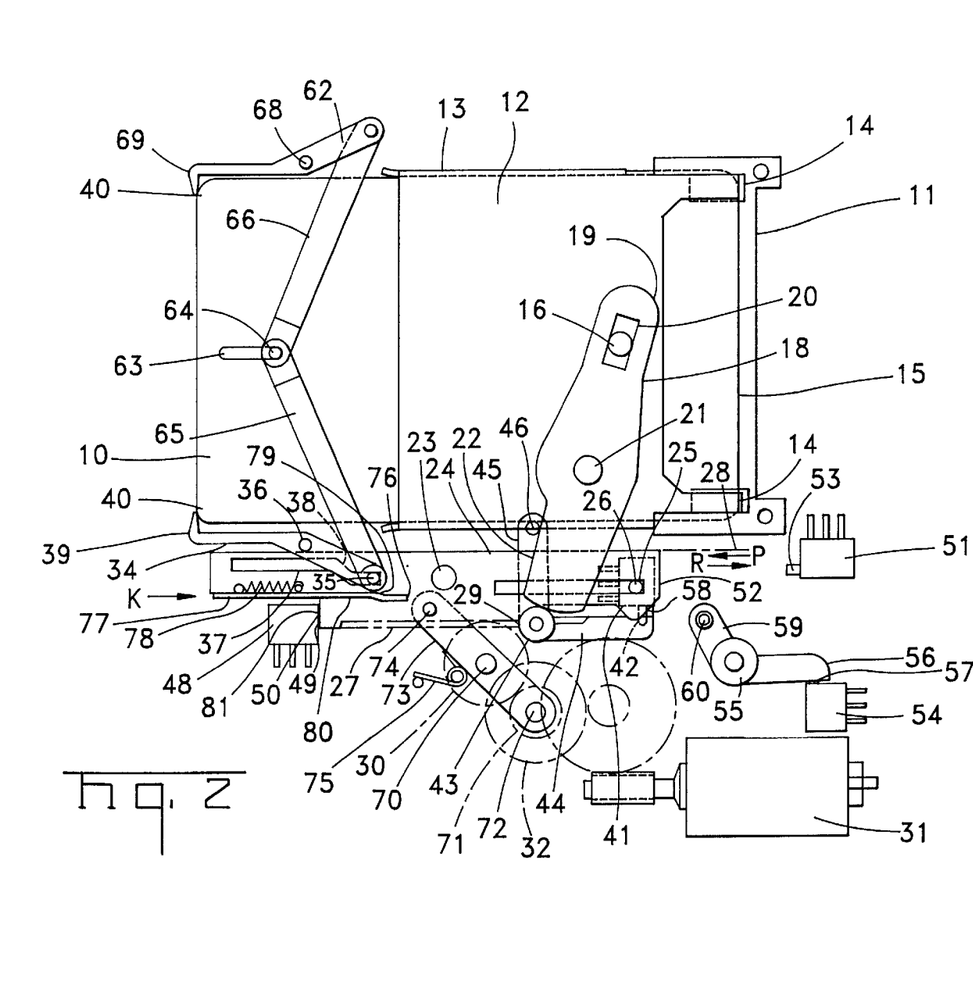
FIG. 2 is a plan view of the first embodiment with the protector in operation.

Now, preferred embodiments of the eject protection mechanism of a card according to the present invention will be described in detail hereinafter by reference to the accompanying drawings. Illustrated in FIGS. 1 through 3 are major parts of a first embodiment of the ejection protection mechanism of a card according to the present invention. FIG. 1 shows the condition when a card 10 is manually inserted into a connector 11 to complete electrical connection of electrical contacts. Represented by the reference numeral 12 is a holder for receiving the card 10 with the holder 12 sliding along a guide 13 in a card compartment. Similarly, reference number 14 represents projections made by bending edges of the holder 12 in such a manner to engage a card insertion end 15 of the card 10 by projecting inside of the holder 12.

Represented by reference number is an actuation shaft formed on one surface of the holder 12 and slidably mates with an elongate hole or window 20 in one arm 19 of a pushing member 18 which is pivotable about a support shaft 21. An operation or actuation arm extends to the other side of the arm 19. A driving pin 23 engages the actuation arm 22 which is mounted on a shift plate 24. A a linear guide groove or slot 25 is in the shift plate 24 into which a set pin 26 is inserted. The shift plate 24 moves linearly in cooperation with guides 27, 28. 29 is a linear rack formed at one side of the shift plate 24 to engage a pinion 30 which is driven by a motor 31 by way of appropriate gear train 32.

Represented by the reference numeral 33 is a crank-shaped cam groove to guide an actuation pin 35 formed on a main protect arm 34 comprising a protection member. The main protect arm 34 pivots about a support shaft 36 and swings depending on the position of the actuation pin 35 in the cam groove 33. When the actuation pin 35 is located in an outer cam groove 37, the path for the card 10 is open. On the other hand, when actuator pin 35 is in an inner cam groove 38, a hook portion 39 of the main protect arm 34 engages a trailing edge shoulder portion 40 of the card 10, thereby preventing ejection or removal of the card 10 (See FIG. 2).

Represented by reference number 41 is a switch ($S_1$) to send a signal indicating complete insertion or loading of the card 10 when its actuator 42 is pushed by an actuation arm 44 of an L-shaped lever 43. The L-shaped lever 43 is biased by a twisted coil spring (not shown) in a clockwise direction in the drawing so that the actuation arm 44 is normally maintained at a remote position from the actuator 42. An actuation pin 46 formed on an operation arm 45 of the L-shaped lever 43 is pushed by the actuation arm 22 of the pushing member 18 which causes the actuation arm 44 to rotate counterclockwise, thereby actuating the actuator 42.

Reference number 48 represents a switch ($S_2$) for detecting that the protect arm 32 is functioning by pushing the actuator 50 by a step portion 49 of the shift plate 24. Reference number 51 represents a switch ($S_3$) to send an eject completion signal of the card 10 when the actuator 53 is pushed by a front end 52 of the shift plate 24. Reference number 54 represents a switch ($S_4$) to send a signal indicating that the holder 12 and the pushing member 18 coupled therewith are in an insertion stand-by position when the actuator 57 is pushed by an actuation arm 56 of an L-shaped lever 55. The lever 55 is normally biased clockwise by a twisted coil spring (not shown) so that the actuation arm 56 is normally in a position to push the actuator 57 inwardly. When an operation projection 58 of the shift plate 24 pushes an actuation 60 formed on an operation arm 59, the actuation arm 56 rotates to actuate an actuator 57.

Now, an operation of one embodiment of the subject protection mechanism of a card according to the present invention will be described. In an initial condition with the card 10 not inserted, the actuation arm 22 of the pushing member 18 is located substantially distant from the operation pin 46 of the L-shaped lever 43. The operation projection 58 of the shift plate 24 engages the actuation pin 60 and the L-shaped lever 55 rotates which causes the actuator 57 to be in an out position, thereby sending the stand-by signal from the switch ($S_4$) 54 and maintaining the motor 31 in the stop condition. Also, the actuation pin 35 of the protect arm 34 is positioned into the outer cam groove 37 to hold the hook portion 39 in an open position. This allows the holder 12 and the pushing member 18 to move freely within a given range under the friction between the holder 12 and the guide 13.

Connection of electrical contacts will be established by inserting the card 10 into the holder 12 until mated with the connector 11. The projections 14 of the holder 12 engage the insertion end 15 of the card 10 for moving the holder 12 along with the card 10. Then, the actuation shaft 16 of the holder 12 pivots the pushing member 18, thereby pushing the actuation pin 46 of the L-shaped lever 43 for actuating the switch ($S_1$) 41 and also detecting complete insertion of the card 10. At this point, the holder 12 is restricted only by friction between the guides 13 at both sides of the holder 12 and contact pins 61 (see FIG. 3) of the connector inserted into the connection pin holes of the card, thereby permitting free insertion and removal of the card 10.

By sending the protect signal from a control panel (not shown), contacts of the switch ($S_4$) 54 are shunted to drive the motor 31. The driving force of the motor 31 is transmitted to the rack 29 from the pinion 30 by way of the gear train 32, thereby moving the shift plate 24 in the direction of an arrow P in FIGS. 1–3. Now, the actuation pin 35 of the protect arm 34 is positioned in the inner cam groove 38, thereby pivoting the hook portion 39 to the closed position. In the position in FIGS. 2, the step portion 49 of the shift plate 24 pushes the actuator 50 and actuates the switch ($S_2$) 48, thereby sending the signal indicating that the protect arm 34 has functioned before stopping the motor 31. Under this condition, the hook portion 39 of the protect arm 34 engages the trailing end shoulder portion 40, thereby preventing the card 10 from being ejected.

In this manner, ejection of the card 10 is carried out by electrical power, i.e., by sending an ejection signal from a control panel (not shown) or by executing programmed instructions. For this end, the motor 31 rotates in the opposite direction to the above so as to move the shift plate 24 in the direction of an arrow R in the drawings, thereby setting the jumper circuit to the switch ($S_4$) 54. The actuation pin 35 of the protect arm 34 is positioned in the outer cam groove 37 to pivot the hook portion 39 away from the path of the card 10 by disengaging it from the trailing edge shoulder 40 of the card 10.

The shift plate 24 continues to move until the driving pin 23 pushes the actuation arm 22 of the pushing member 18 to open the switch ($S_1$) 41 and drives the actuation shaft 16 engaging the elongate hole 20 for sliding the holder 12 in the ejecting direction. During such movement, the actuation projection 58 of the shift plate 24 momentarily pushes the actuation pin 60 to rotate the actuation arm 56 for actuation of the switch ($S_4$) 54. However, because of the setting of the jumper circuit as mentioned above, such actuation is electrically ignored and the switch ($S_4$) 54 does not stop the motor 31. Movement of the holder 12 brings the projections 14 into engagement with the insertion end 15 of the card 10 to remove the card 10 from the contact pins 61 of the connector 11 to a location where the card 10 can be easily removed from the compartment by hand.

In the position as shown in FIG. 3, the leading end 52 of the shift plate 24 pushes the actuator 53 to actuate the switch ($S_3$) 51. The switch ($S_3$) 51 causes the motor 31 to rotate in the reverse direction as soon as the jumper circuit to the switch ($S_4$) 54 is released, thereby moving the shift plate 24 again in the direction of the arrow P. The operation arm 58 of the shift plate 24 pushes the actuation pin 60 on the operation arm 59 to permit the actuator 57 to move outwardly by the actuation arm 56 of the L-shaped lever 55 being removed therefrom. The motor 31 then stops rotating to send a stand-by signal from the switch ($S_4$) 54. Now, the driving pin 23 of the shift plate 24 moves to the stand-by position not interfering with the rotation of the pushing member 18. The driving pin 23a, the L-shaped lever 55a, the actuation projection 58a and the cam groove 33a in the stand-by position are shown in FIG. 3 by double-dashed lines.

In the particular embodiment, a follower protect arm 62 is provided at the opposite side to the main protect arm 34 as a supporting shaft of the actuation pin 35 of the main protect arm 34, thereby adapting to move in the similar manner as the main protect arm 34 by links 65, 66 mutually coupled by a coupling pin 64 guided in a linear groove 63 in a device frame (not shown). Note that the follower protect arm 62 pivots about the support shaft 68 in ganged relationship with the main protect arm 34 with the hook portion 69 functioning similar to the hook portion 39 of the main protect arm 34. It is to be noted, however, that the follower protect arm 62 is provided only for enhancing visual warning or improved appearance and that the main protect arm 34 alone is sufficient for the intended protection purpose.

Also, provided in this embodiment is a manual card ejection mechanism so that the card can be ejected manually in case of power failure of batteries, loss of electrical power due to circuit troubles, etc. That is, the rotary shaft 70 of the pinion 30 is rotatably mounted on the arm 73 along with the rotary shaft 72 of the gear 71. Pivotal movement of the pin 74 mounted at the end of the arm 73 disengages the pinion 30 from the rack 29. An arm of a twisted coil spring 75 biases the arm 73 to restore the engagement between the pinion 30 and the rack 29.

Normally, the pin 74 is locked to a predetermined position by a hook portion 76 so that the pinion 30 and the rack 29 are properly engaged to transfer the driving force with no trouble. A lever 77 is linearly guided to slide in the direction of the arrow K and biased by a recovery tension coil spring 78 in the opposite direction to the arrow K. Moving the lever 77 manually in the direction of the arrow K against the bias force of the coil spring 78 will disengage the hook 76 and let the pin 74 move to the surface 80 along a slope 79. Such movement of the pin 74 disengages the pinion 30 from the rack 29 to set free the shift plate 24.

Further pushing of the lever 77 brings the step portion 81 of the lever 77 in abutment against the step portion 49 of the shift plate 24 to push it to rotate the pushing member 18 by the engagement between the driving pin 23 and the actuation arm 22. The card 10 as well as the holder 12 are then moved in the ejecting direction by the actuation shaft 16. However, a special mechanism not shown in the drawings is provided to permit only a dedicated person to have access to the lever 77.

Figure 4:
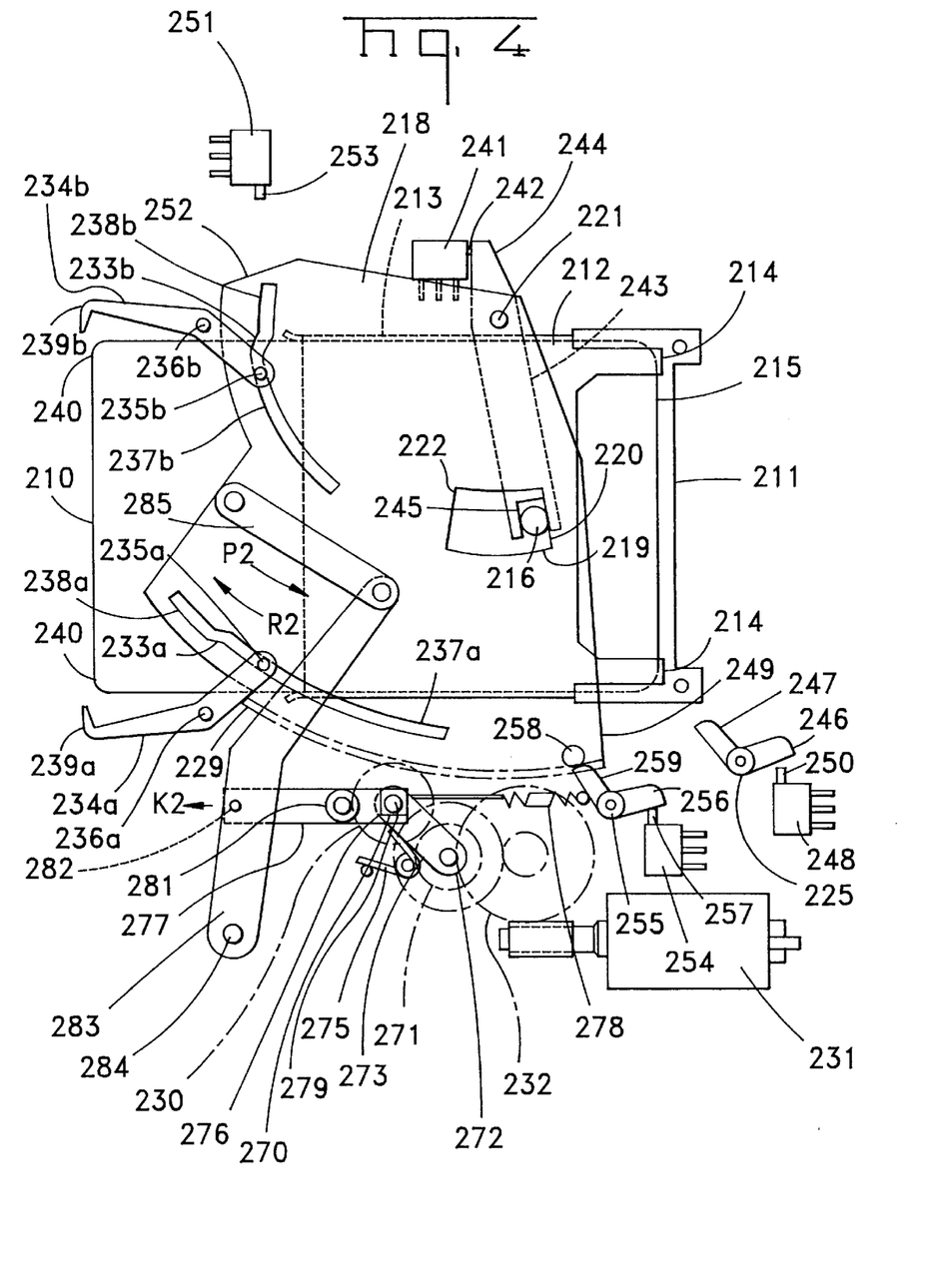
FIG. 4 is a plan view of a second embodiment of the ejection protection mechanism of a card according to the present invention with the card being loaded.
Figure 5:
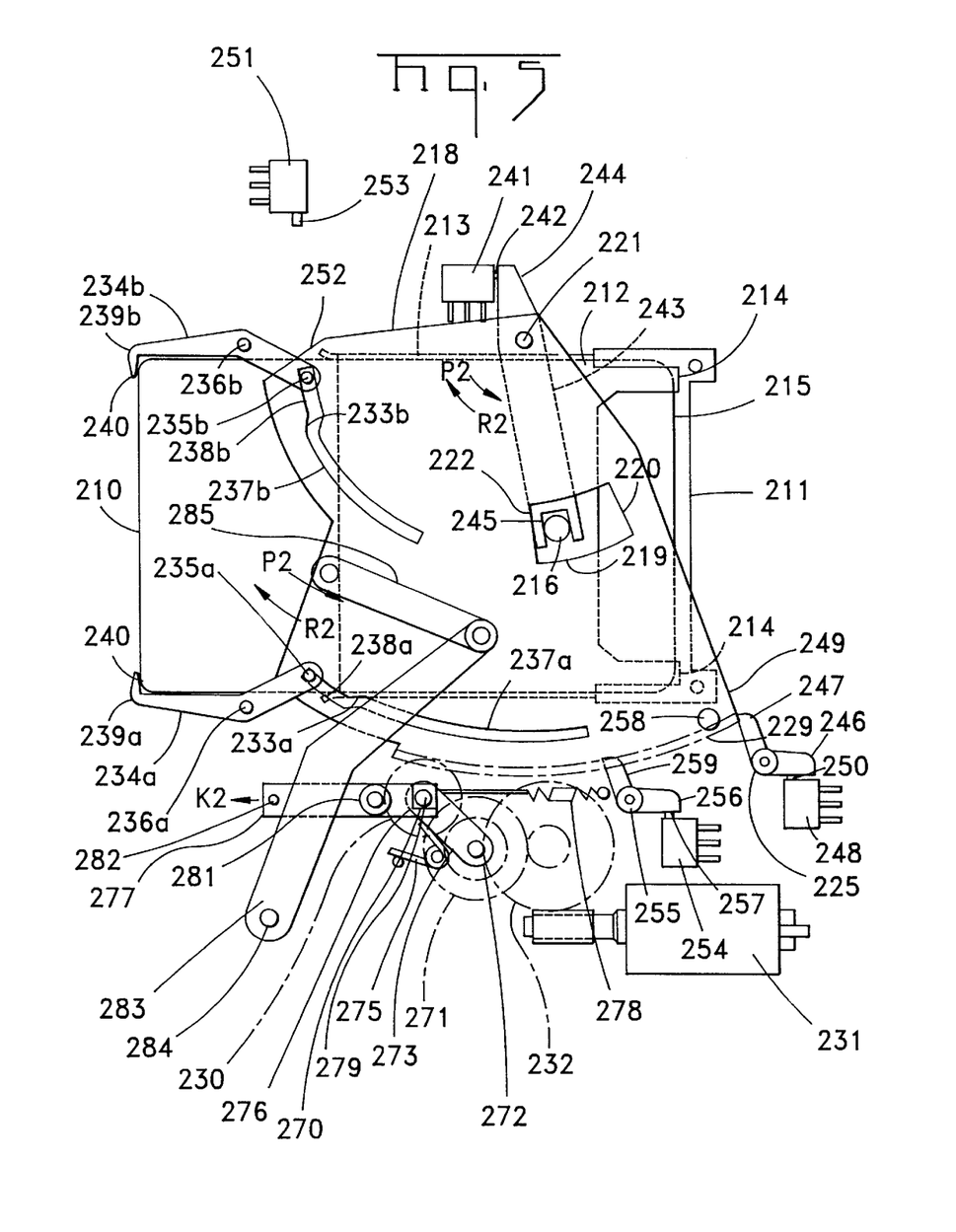
FIG. 5 is a plan view of the second embodiment with the protector in operation.
Figure 6:
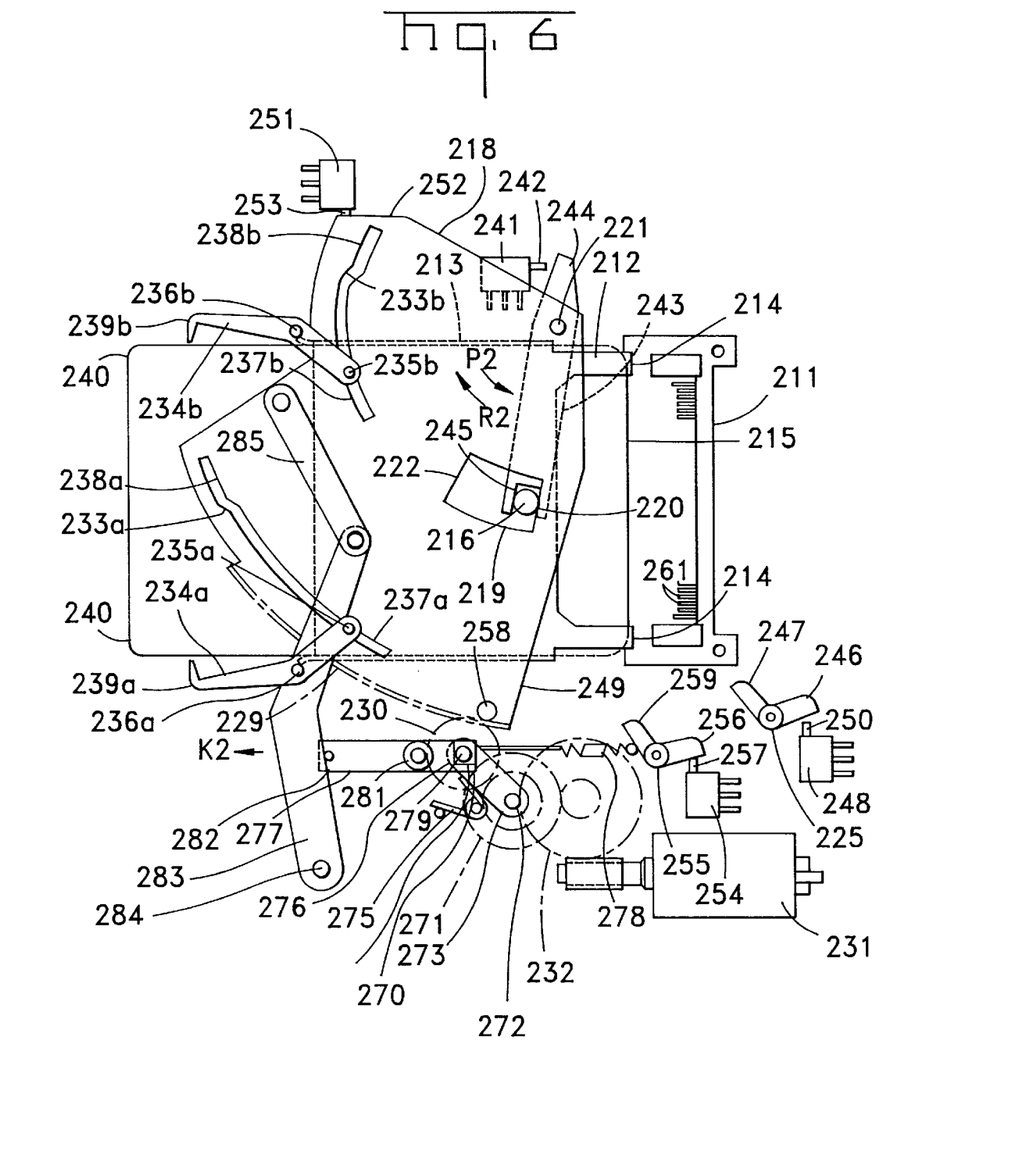
FIG. 6 is a plan view of the second embodiment with the card ejected.

Illustrated in FIGS. 4 through 6 is a second embodiment of the ejection protection mechanism of a card according to the present invention. Shown in FIG. 4 is the card 210 manually inserted into the connector 211 to complete connection of electrical contacts. Represented by reference number 212 is a holder for receiving the card 210 for sliding along guides 213 of the card compartment. Represented by reference number 214 are projections made by bending down the edge of the holder 212 so as to engage the insertion end 215 of the card 210 by extending inside of the holder 212.

Reference number 216 represents an operation or actuation shaft on one surface of the holder 212 and extends in a window 219 formed in a pushing member 218 to engage one side 220 of the window 219. The pushing member 218 rotates about a support shaft 331. 229 is a fan-shaped rack formed at the arcuate circumferencial edge opposite the support shaft 221 in such a manner to engage with a pinion 230. The pinion 230 is driven by a motor 231 by way of a gear train 232 so that the pushing member 218 pivots in accordance with the movement of the pinion 230.

Reference numbers 233a and 233b represent cranked shaped cam grooves for guiding actuation pins 235a, 235b formed on the protect arms 234a, 234b defining a protection member, respectively. The protect arms 234a, 234b are designed to freely rotate about the respective support shafts 236a, 236b to pivot depending on the position of the actuation pins 235a, 235b within the cam grooves 233a, 223b. When the actuation pins 235a, 235b are positioned in the inner cam grooves 237a, 237b, the path for the card 210 is open. On the other hand, when they are in the outer cam grooves 238a, 238b, hook portions 239a, 239b of the protect an 234a, 234b engage the rear shoulders 240 of the card 210 to prevent ejection of the card 210.

Reference number 241 represents a switch ($S_1$) to send a loading completion signal of the card 210 when an actuator 242 is pushed inwardly by an actuation arm 244 of a lever 243. The lever 243 has a cut-out 245 at the Opposite end to the actuation arm 244 for receiving the actuation shaft 216 so as to be ganged with the holder 212. When the holder 212 moves to the completely loaded position along with the card 210, the actuation arm 244 actuates the actuator 242.

Reference number 248 represents a switch ($S_2$) to detect that the protect arm 234a, 234b are in their stand-by position when one side 249 of the pushing member 218 engages the operation arm 247 of the L-shaped lever 225 to rotate the actuation arm 246 and push the actuator 250 inwardly. The L-shaped lever 225 is normally biased counterclockwise by a twisted coil spring so that the actuation arm 246 is held away from the actuator 250.

Reference number 251 represents a switch ($S_3$) to send an eject completion signal of the card 210 when the actuator 253 is pushed by another side 252 of the pushing member 218. Reference number 254 represents a switch (S₄) to send a signal indicating that the holder 212 and its associated pushing member 218 are ready (stand-by) when the actuator 257 is released from the actuation arm 256 of the L-shaped lever 255, The lever 255 is normally biased clockwise by a twisted coil spring not shown in the drawing, thereby normally positioning the actuation arm 256 to push the actuator 257 inwardly. When the actuation pin 258 on the pushing member 218 pushes the operation or actuation arm 259, the actuation arm 256 rotates to release the actuator 257 (See FIG. 4).

Now, the operation of the ejection protection mechanism of a card of the above embodiment will be described. In the initial condition having no inserted card 210, the holder 212 is located near the card insertion end of the compartment. The actuation shaft 216 is adjacent to the opposite side 222 of the engaging side 220 of the window 219, thereby holding the actuation arm 255 of the lever 243 sufficiently distant from the actuator 242 of switch 241 (S₁). Also, the actuation pin 258 of the pushing member 218 is in engagement with the operation arm 259 to rotate the L-shaped lever 255 to release the actuator 257. The switch (S₄) 254 then sends the stand-by signal and maintains the motor 231 in its stationary condition. Additionally, the actuation pins 235a, 235b of the protect arms 234a, 234b are guided to the inner cam grooves 237a, 237b to hold the hook portions 239a, 239b in their release position. The holder 212 is now free to move actuation shaft 216 within the window 219 and with frictional force with the guides 213.

The card 210 is inserted into the holder 212 to complete connection of the electrical contacts when fully inserted into the connector 211. The holder 212 has the projections 214 that engage the card 210 at the insertion end 215 to move the holder 212 and the card 210 as a unit. The actuation shaft 216 of the holder 212 moves to a location abutting against the engaging side 220 of the window 219 in the pushing member 218. The actuation arm 255 of the lever 243 pushes the actuator 242 to actuate the switch (S₁) 241, thereby detecting the full insertion of the card 210. At this point, friction forces of the guides 213 at both sides of the holder 212 and the contact pins 261 (See FIG. 6) of the connector inserted into connection pin receptacles in the card 210 are the only restriction of the holder 212, thereby assuring easy and free manual insertion and extraction of the card 210 against such frictional forces.

Contacts of the switch (S₄) 254 are shunted by a protect signal sent from a control panel (not shown) or separate program to drive the motor 231. The driving force from the motor 231 is transmitted to the rack 229 by way of the gear train 232 and the pinion 230, thereby moving the pushing member 218 in the direction of the arrow P₂. The actuation pine 235a, 235b of the protect arms 234a, 234b are first guided to the outer cam grooves 238a, 238b to rotate the hook portions 239a, 239b to their closed position, respectively.

In the position as shown in FIG. 5, the side 249 of the pushing member 218 engages the operation arm 247 of the L-shaped lever 225 to rotate the actuation arm 246 which in turn pushes the actuator 250 to actuate the switch (S₂) 248. The switch (S₂) 248 then sends a signal indicating that the protect arms 234a, 234b have operated and stops the motor 231. Under this condition, the hook portions 239a, 239b of both protect arms 234a, 234b engage the trailing shoulders 240 of the card 210, thereby preventing the card 210 from being ejected.

This means the ejection of the card 210 is performed by electrical power under control of the eject signal from a control panel (not shown) or executing such program. That is, the motor 231 is driven in the opposite direction to the above and rotates the pushing member 218 in the direction as shown by the arrow R₂. This sets the jumper circuit to the switch (S₄) 254. The actuation pins 235a, 235b of the protect arms 238a, 234b are guided to the inner cam grooves 237a, 237b. The hook portions 239a, 239b release the engagement with the trailing end shoulders 240 and rotate outside of the path of the card 210.

The pushing member 218 continues to rotate until the engaging side 220 of the window 219 pushes the actuation shaft 216, thereby sliding the holder 212 in the ejecting direction. Simultaneously, the switch (S₁) 241 is operated to its open position due to the lever 243 engaging the actuation shaft 216 via cut-out 245. During this movement of pushing member 218, the actuation pin 258 of the pushing member 218 engages the operation arms 259 of lever 255 to actuate the switch (S₄) 254. However, the setting of the jumper circuit mentioned above electrically negates the actuation, thereby disabling the switch (S₄) 254 thereby stopping the motor 231. Movement of the holder 212 allows the projections 214 of the holder 212 to engage the card insertion end 215, thereby disengaging the contact pins 261 of the connector 211 from the card 210. Now, the card 210 can be ejected from the compartment easily by a manual operation.

In the position shown in FIG. 6, the side 252 of the pushing member 218 pushes the actuator 253 to actuate the switch (S₃) 251 which releases the jumper circuit of the switch (S₄) 254 and rotates the motor 231 in the reverse direction. This, in turn, rotates the pushing member 218 again in the direction of the arrow P₂. The actuation pin 258 of the pushing member 218 engages the operation arms 259 to operate the actuator 257 to its open side by the actuator arm 256 of the L-shaped lever 255. The switch (S₄) 254 sends the stand-by signal to stop the motor 231. At this time, the pushing member 218 rotates to its stand-by position (See FIG. 4) where the engaging shaft 216 engages the engaging side 220 of the window 219.

In this particular embodiment, components are minimized because of the pushing member 218 conducting both functions of the pushing member 18 and the shift plate 24 in the first embodiment. Additionally, the provision of two cam grooves 233a, 233b in the pushing member 218 enables it to simultaneously and directly drive the two protect arms. However, it is obvious that only one protect arm is functionally sufficient as in the case in the first embodiment.

As in the first embodiment, this embodiment also includes a manual card ejection mechanism so that the card 210 can be ejected in unexpected conditions. To this end; the rotary shaft 270 of the pinion 230 is rotatably mounted about the rotary shaft 272 of the gear 271 via an arm 273. Pivotal movement of the shaft 270 disengages the pinion 230 and the rack 229. The twisted coil spring 275 is provided to bias the arm 273 so that the pinion 230 and the rack 229 return to their engaged condition.

Normally, the rotary shaft 270 is locked to a predetermined position by the hook 276, thereby bringing the pinion 230 and the rack 229 in their proper alignment to transfer the driving force. The lever 277 is linearly guided to slide in the direction of the arrow K₂. The tension coil spring 278 applies a bias in the reverse direction to the arrow K₂. For example, a special tool (not shown) is used to grip a small hole 282 in the lever 277 to move it manually in the direction of the arrow K₂ against the tension of the coil spring 278, thereby releasing the lock of the hook 276. Then, the rotary shaft 270 moves to the surface 280 along the shaft 279. The movement of the rotary shaft 272 disengages the pinion 230 and the rack 229 to set free the pushing member 218.

Further, pulling the lever 277 causes the pin 281 thereon to engage with a first link 283 to rotate the lever 277 about the fixed shaft 284. The first link 283 rotates the pushing member 218 by way of a second link 285 rotatably coupled to the pushing member 218, thereby pushing the actuation shaft 216 against the engaging side 220 of window 219 to move the card 210 as well as the holder 212 in the ejecting direction. However, provided is a mechanism not shown in the drawings to limit access to the lever 277 only to a dedicated person.

Figure 7:
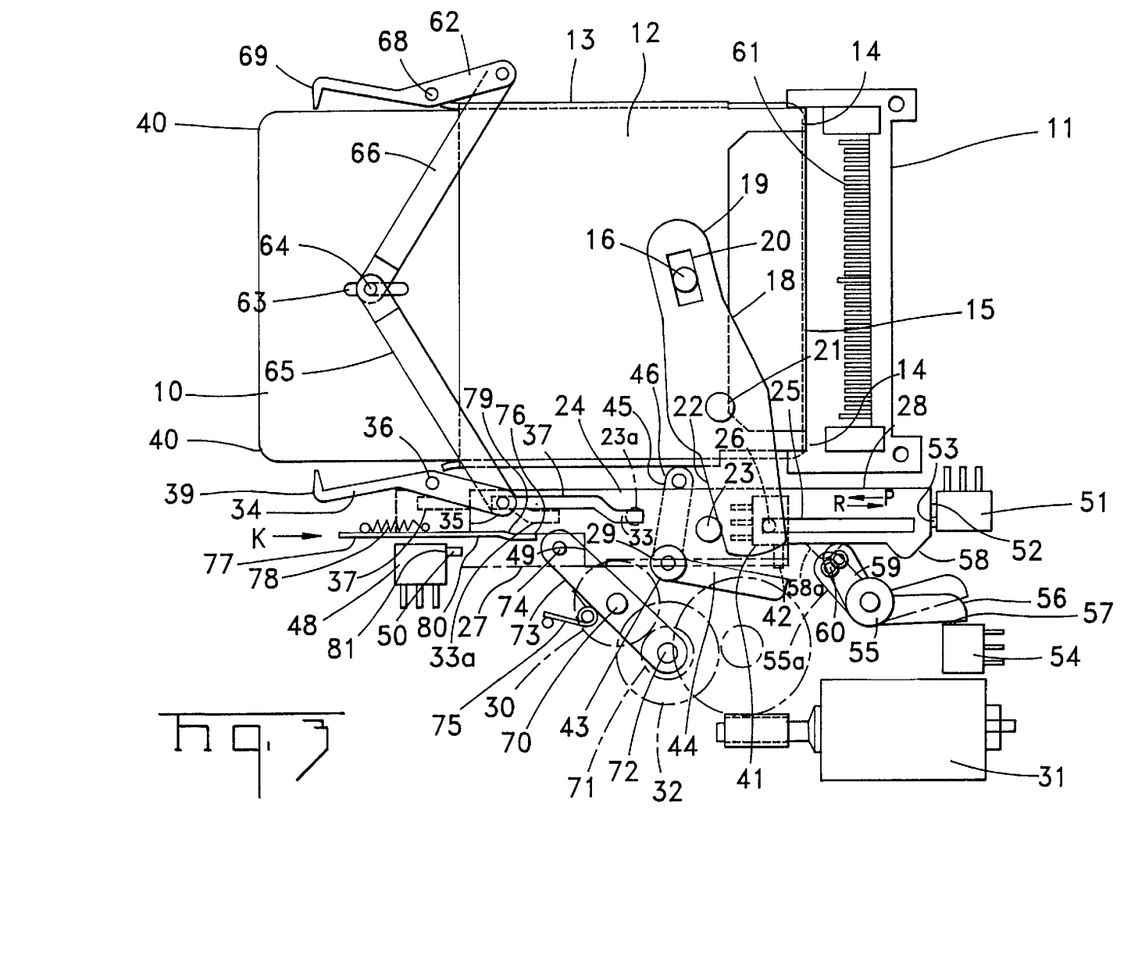
FIG. 7 is a plan view of a third embodiment of the ejection protection mechanism of a card according to the present invention with the card being loaded.
Figure 8:
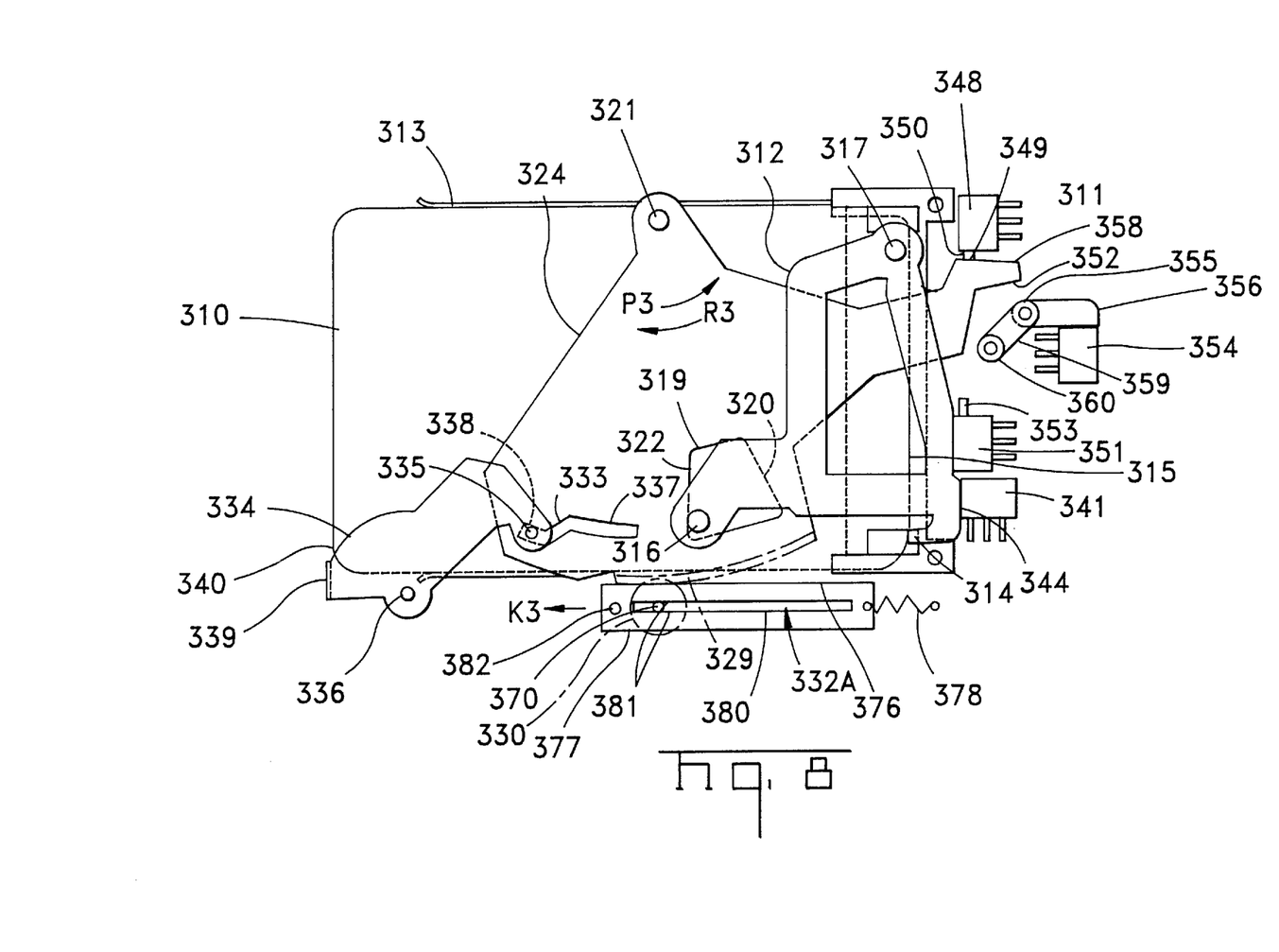
FIG. 8 is a plan view of the third embodiment with the protector in operation.

Now, a third embodiment of the ejection protection mechanism of a card according to the present invention will be described by reference to FIGS. 7 through 10. A driving mechanism by electrical power is shown only in outline in FIG. 7 in order to avoid complexity. A magnified side view along the line 10—10 in FIG. 7 is shown in FIG. 10. Also, shown in FIG. 8 is a simplified view of an emergency manual ejection mechanism. Shown in FIG. 7 is a card 310 manually inserted into a connector 311 to establish complete electrical connection of the electrical contacts. Reference number 312 represents a pushing member rotatable in a predetermined range by pivotal support onto a fixed shaft 317. Projection 314 engaging the card 310 is formed by bending down the end of the pushing member 312 to engage the insertion end 315 of the card 310.

Reference number 316 represents an actuation shaft mounted on one end of the pushing member 312 to extend into a window 319 in a shift plate 324 for engagement with one side 320 of the window 319. The shift plate 324 is rotatable about the support shaft 321. Reference number 329 represents a fan-shaped rack formed at the arcuate periphery facing the support shaft 321 to engage a pinion 330 which is driven by a motor 331 by way of appropriate gear train 332. The shift plate 324 pivots in response to the pinion 330.

Reference number 333 represents a crank shaped cam groove for guiding an actuation pin 335 mounted on a protect arm 334 constituting the protection member. The protect arm 334 is pivotable about the support shaft 331 to pivot depending on the position of the actuation pin 335 within the cam groove 333. With the actuation pin 335 located within the inner cam groove 337, the path of the card 310 is open. On the other hand, when located within the outer cam groove 338, the hook portion 339 of the protect arm 334 engages the trailing end shoulder 340 of the card 310 to prevent the card 310 from being ejected.

Reference number represents a switch ($S_1$) to send a loading completion signal indicating a full insertion of the card 310 when an actuator 324 (FIG. 9) is pushed by an edge 344 of the pushing member 312. Reference number represents a switch ($S_2$) to detect that the protect arm 334 is in operation when one operation member 349 of the shift plate 324 pushes the actuator 350. Reference number 351 represents a switch ($S_3$) to send an ejection completion signal indicating that the card 310 is fully ejected when the actuator 353 is pushed by another operation member 352 of the shift plate 324.

Reference number 354 represents a switch ($S_4$) to send a signal indicating that the shift plate 324 is in the insertion stand-by position when the actuator 357 is released from the actuation arm 356 of the L-shaped lever 355. The lever 355 is normally biased clockwise by a twisted coil spring (not shown in the drawing), thereby locating the actuation arm 356 in a position normally pushing the actuator 357 inwardly. Pushing the actuation pin 360 on the operation arm 359 of the lever 355 by the actuation member 358 of the shift plate 324 urges she actuation arm 356 to rotate, which in turn, operates the actuator 357 (See FIG. 7).

Now, the operation of the above embodiment of the ejection protection mechanism of a card will be described. In the initial condition when the card 310 is not inserted or loaded, the pushing member 312 is located at the card insertion side of the compartment in its pivotal range. The actuation shaft 316 is located near the opposite side 322 to the engaging side 320 or the window 319. The edge 344 of the pushing member 312 is held in its non-actuation position so that the actuator 324 of switch ($S_1$) 341 is at an outer position.

Additionally, the shift plate 324 operates the L-shaped lever 355 causing the actuator 357 of switch ($S_4$) 364 to move to its open position by the engagement of the actuation member 358 with the actuation pin 360 on the operation arm 359. The switch ($S_4$) 354 sends the stand-by signal to the motor 331 and maintains it in the stop condition. The actuation pin 335 of the protect arm 334 is guided into the inner cam groove 337 to hold the hook portion 339 in its open position. The actuation shaft 316 of the pushing member 312 is now freely movable within the window 319 except for the resiliency of the actuator 342 and the frictional force with the fixed shaft 317.

When the card 310 is inserted along the frame guide 313, card 310 is mated with the connector 311 to establish connection of the electrical contacts. The pushing member 312 is engaged by the insertion end 315 of the card 310 at the projection 314 and undergoes pivotal movement as the card 310 moves inwardly. Now, the actuation shaft 316 of the pushing member 312 moves to the position in engagement with the engaging side 320 of the window 319 in the shift plate 324. The edge 344 of the pushing member 312 pushes the actuator 342 to actuate the switch ($S_1$) 341 which detects complete insertion of the card 310. Restriction to the pushing movement of member 312 at this instance is the frictional force with the fixed shaft 317 and the contact forces of the contact pins (not shown) of the connector 311 inserted into connection pin holes of the card 310 (See FIG. 8).

The contacts of the switch ($S_4$) 354 are shunted to drive the motor 331 by sending the protect signal from a control panel (not shown) or executing such program. The driving force of motor 331 is transmitted to the rack 329 by way of the gears 332 and the pinion 330 to move the shift plate 324 in the direction of the arrow $P_3$. The actuation pin 335 of the protect arm 334 is first guided to the outer cam groove 338 to move the hook portion 339 to the closed position. In the position as shown in FIG. 8, the operation member 349 of the shift plate 324 pushes the actuator 350 to actuate the switch ($S_2$) 348 which sends a signal indicating that the protect arm 334 is operated before stopping the motor 331. Under this condition, the hook portion 339 of the protect arm 334 engages the trailing end shoulder 340 of the card 310, thereby preventing the card 310 from being ejected or removed.

This ensures that the card 310 can be ejected by electrical power by sending the ejection signal from the control panel (not shown) or by executing such program. That is, the motor 331 is driven in the reverse direction to move the shift plate 324 in the direction of the arrow $R_3$. The switch ($S_4$) 354 then establishes the jumper circuit. Now, the actuation pin 335 of the protect arm 334 is guided to the inner cam groove 337 to release the engagement between the hook portion 339 and the trailing end shoulder 340 of the card 310 to shift the hook portion 339 outside of the path of the card 310. The shift plate 324 continues to move until the engaging side 320 of the window 319 pushes the actuation shaft 316 of the pushing member 312 which is moved in the ejecting direction to open the switch ($S_1$) 341.

During this movement, the another operation member 358 of the shift plate 324 engages the actuation pin 360 of the operation arm 359, thereby actuating the switch ($S_4$) 354. However, the aforementioned establishment of the jumper circuit electrically negates the actuation. The switch ($S_4$) 354 has no function to stop the motor 331 under this condition. On the other hand, the movement of the pushing member 312 urges the projection 314 to engage the insertion end 315 of the card 310, thereby disengaging the contact pins of the connector 311 from the card 310 to the position where the card 310 can be easily removed manually from the compartment.

Figure 9:
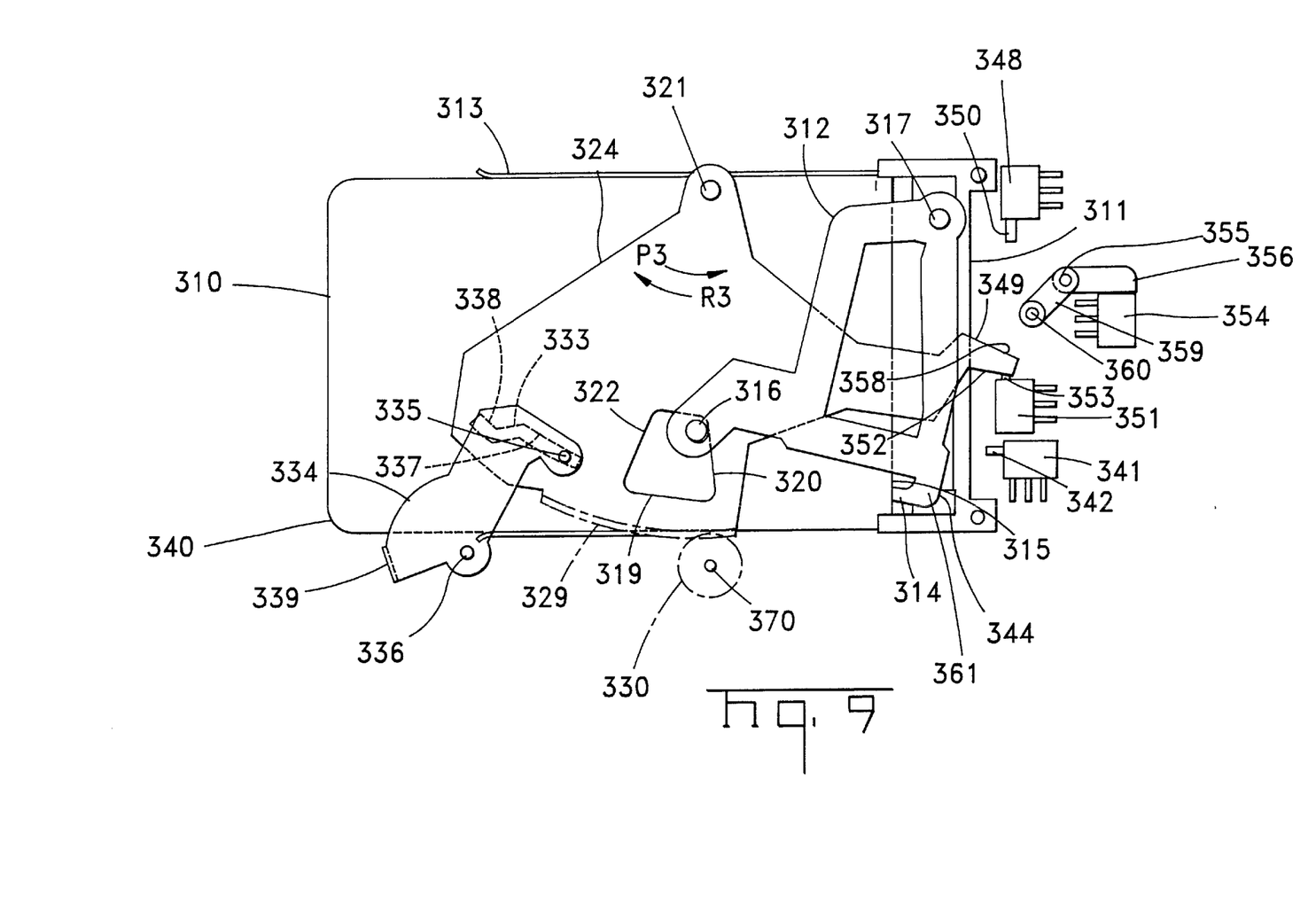
FIG. 9 is a plan view of the third embodiment with the card ejected.
Figure 10:
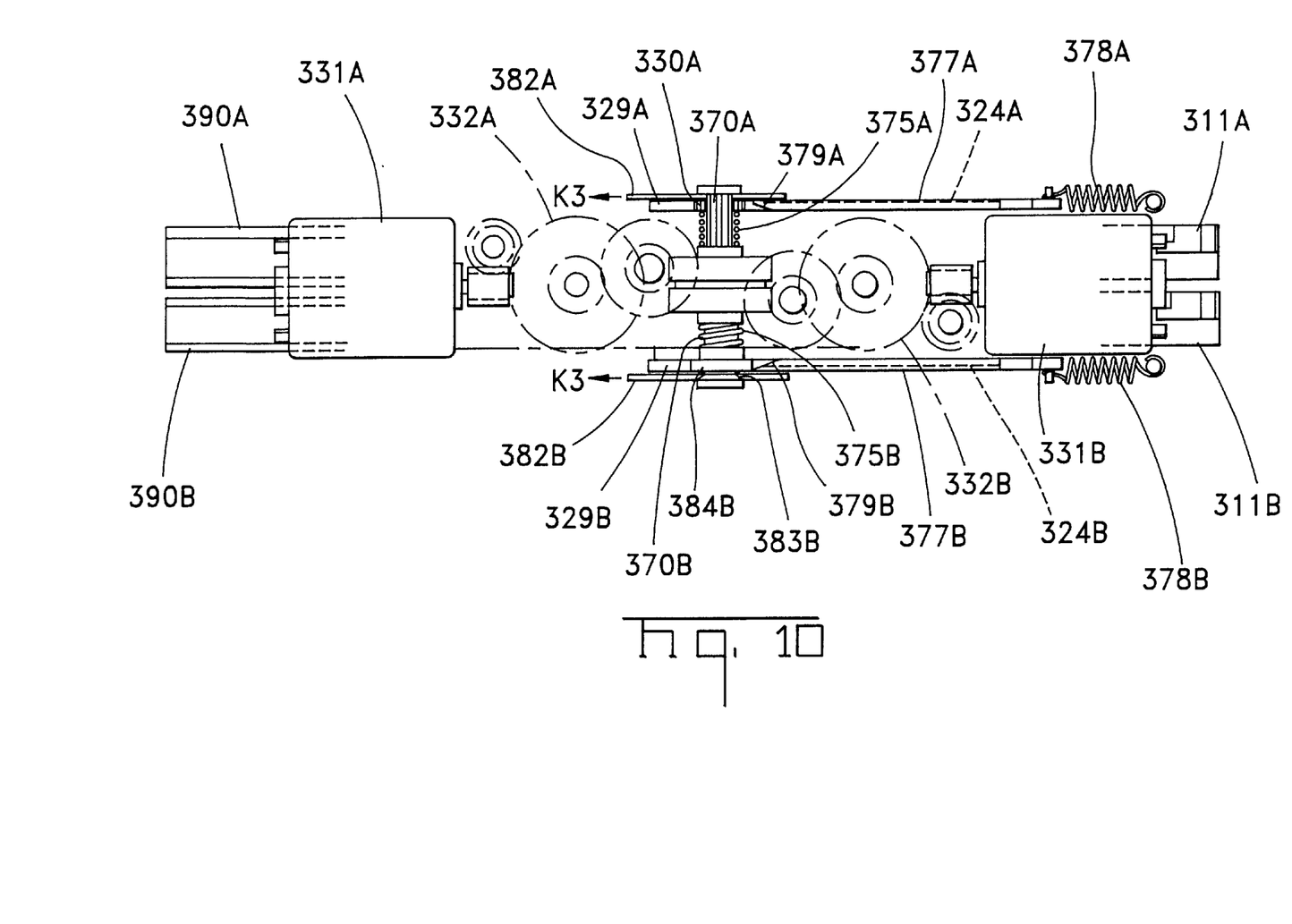
FIG. 10 is a magnified side view along the line 10—10 in FIG. 7.

In the another position as shown in FIG. 9, the operation member 352 of the shift plate 324 pushes the actuator 353 to actuate the switch ($S_3$) 351, thereby releasing the jumper circuit to the switch ($S_4$) 354 and simultaneously rotating the motor 331 in the reverse direction to move the shift plate 324 again in the direction of the arrow $P_3$. The actuation member 358 of the shift plate 324 engages the actuation pin 360 of the operation arm 359 to move the L-shaped lever 355 to release the actuator 357. Then, the switch ($S_4$) 354 sends the stand-by signal to stop the motor 331. The shift plate 324 rotates to and is held in the stand-by position where the actuation shaft 316 is movable without any interference by the engaging side 320 of the window 319 in the shift plate 324. (See FIG. 7).

In the last embodiment, a holder for the card 310 is omitted to reduce the components as compared to the first embodiment. Also, only one protect arm 334 is used. However, it is to be understood that a protect arm 334 can be provided at each side by applying either one of the means as disclosed in the first or the second embodiment.

Again, in the last embodiment, there is provided a manual card ejection mechanism for enabling the card 310 to be removed in an unexpected condition in the similar manner to the first and second embodiments. For this end, the pinion 330 is mounted to slide in the axial direction and rotate in combination with the rotary shaft 370 as shown in FIG. 10. The pinion 330 is biased in the direction to the ends of shaft 370 (vertical direction in FIG. 10) by the compressed coil spring 375. In the present embodiment, the rotary shaft 370 and the pinion 330 have generally cogged mating portions for making them slidable but preventing rotation. An anti-slip key or a spline may be applicable as an alternative technique.

The lever 377 having a linear rack 376 at the side edge is linearly slidable in the direction of the arrow K3 in the same plane as the shift plate 324, Also, it is biased in the opposite direction to the arrow K3 by a recovery tension coil spring 378.

Normally, the pinion 330 is held in position by the compressed coil spring 375 for proper mating or engagement with the fan-shaped rack 329 and also for proper transmission of the driving force. On the other hand as shown in FIG. 8, both side edges 381 of the elongate opening 380 formed in the center portion of the lever 377 in its longitudinal direction is movable along the rotary shaft 370 to engage a wedge-like tapered surface 379 at the forward end so as to be forcingly inserted between the boss 383 of the pinion 330 and a collar 384.

For example, a special tool (not shown) may be used to grip a small hole 382 in the lever 377 to manually move the lever 377 in the direction of the arrow K3 against the bias force of the coil spring 378. In this way, the pinion 330 can be pushed down by the wedge-shaped slope 379 to the distance equal to the thickness of the lever 377. This will disengage the engagement between the fan-shaped rack 329 of the shift plate 324 and the pinion 330, thereby alternatively engaging with the rack 376 of the lever 377.

Accordingly, further pushing of the lever 377 will cause the shift plate 324 to pivot. The engaging side 320 of window 319 pushes the actuation shaft 316 to move the card 310 in the ejection direction along with the pushing member 312. Similarly to the first and the second embodiments, a mechanism not shown in the drawing assures that only a dedicated person is accessible to the lever 377.

Additionally, the electrical driving system in FIG. 10 is an application to dual card compartments. Since the pinion 330, which is the final stage, is located at the center portion of the compartment side edge, the electrical driving mechanism can be integrated at one side of the compartment to achieve a compact design. In FIG. 10, all components having surfix A in their reference numeral constitute a driving mechanism for the upper card compartment 390A while those having surfix B constitute a driving mechanism for the lower card compartment 390B. This configuration is also applicable to the first and second embodiments.

As apparent from the above description, the ejection protection mechanism of a card according to the present invention effectively protects the ejection of the card inserted into the compartment by electrically closing the protection member. That is, the card cannot be ejected when it is accessed or in operation, thereby effectively protecting the stored information in the card from damage.

Additionally, the electrical operation performed by software is thief-free or effective to prevent the card from being stolen. Another advantage is to avoid any damage to the electrical contacts due to a smooth electrical ejection operation of the card. On the other hand, engagement of the manual insertion operation and electrical ejection operation is effected only in the pushing or ejecting direction. This ensures free manual insertion/ejection unless the protect operation is effected.

Furthermore, if the electrically powered pinion is disposed at the center of the card compartment, the electrical driving mechanism can be located at only one side of the card compartment, thereby providing dual card compartment construction for controlling two cards in a limited space to achieve a compact design.

The invention is claimed in accordance with the following:

1. A device for receiving a card comprising a compartment for receiving the card including an electrical connector for electrical connection with the card, an ejection mechanism for ejecting the card from the compartment, said device comprising:

said ejection mechanism including a protection member for locking with a rear end of the card, said ejection mechanism comprising a motor responsive to a first control signal generated by an external device for electing said card, said protection member having means for being electronically controlled in response to a second control signal generated by said external device to unlock from the card only after cessation of all data transmission between the card and the connector electrically connected to said external device but otherwise maintain the card within the compartment.

2. A device as claimed in claim 1, wherein said ejection mechanism comprises a holder having projections at a front end thereof for engaging a front end of the card to eject the card.

3. A device as claimed in claim 2, wherein a pushing member is operatively connected to said holder by an operation shaft on said holder and being disposed in a window of said pushing member.

4. A device as claimed in claim 1, wherein said ejection mechanism comprises a shift plate having a rack thereon engageable with an electrically driven pinion, a crank shaped cam in said shift plate, said protection member being pivotally mounted on a shaft, and an actuation pin on said protection member and disposed in said crank shaped cam for moving said protection member between a position away from the rear end of the card and a position engaging the rear end of the card.

5. A device as claimed in claim 4, wherein said rack is linear.

6. The device as claimed in claim 1, wherein said device has a card receiving space for receiving said card and the ejection mechanism includes a pair of protect arms, wherein one of said arms is located at one side to be directly engaged with an actuating shift member, said actuating shift member being slidable at said one side and linked with and responsive to said motor of said ejection mechanism, while the other one of said arms is located at the other side opposite to said one side and linked with said actuating shift member at said one side by at least one intermediate link.

7. The device of claim 6, wherein said pair of arms engage both side ends of the received card.

8. A device for receiving a card comprising a compartment for receiving the card including an electrical connector for electrical connection with the card, an ejection mechanism for ejecting the card from the compartment, characterized in that:

said ejection mechanism includes a protection member for locking with a rear end of the card, said protection member being located at each side of the card, said ejection mechanism being electrically actuatable and the protection member being electronically controlled to unlock from the card only after cessation of all data transmission between the card and the connector but otherwise maintain the card within the compartment.

* * * * *